Figure 1:
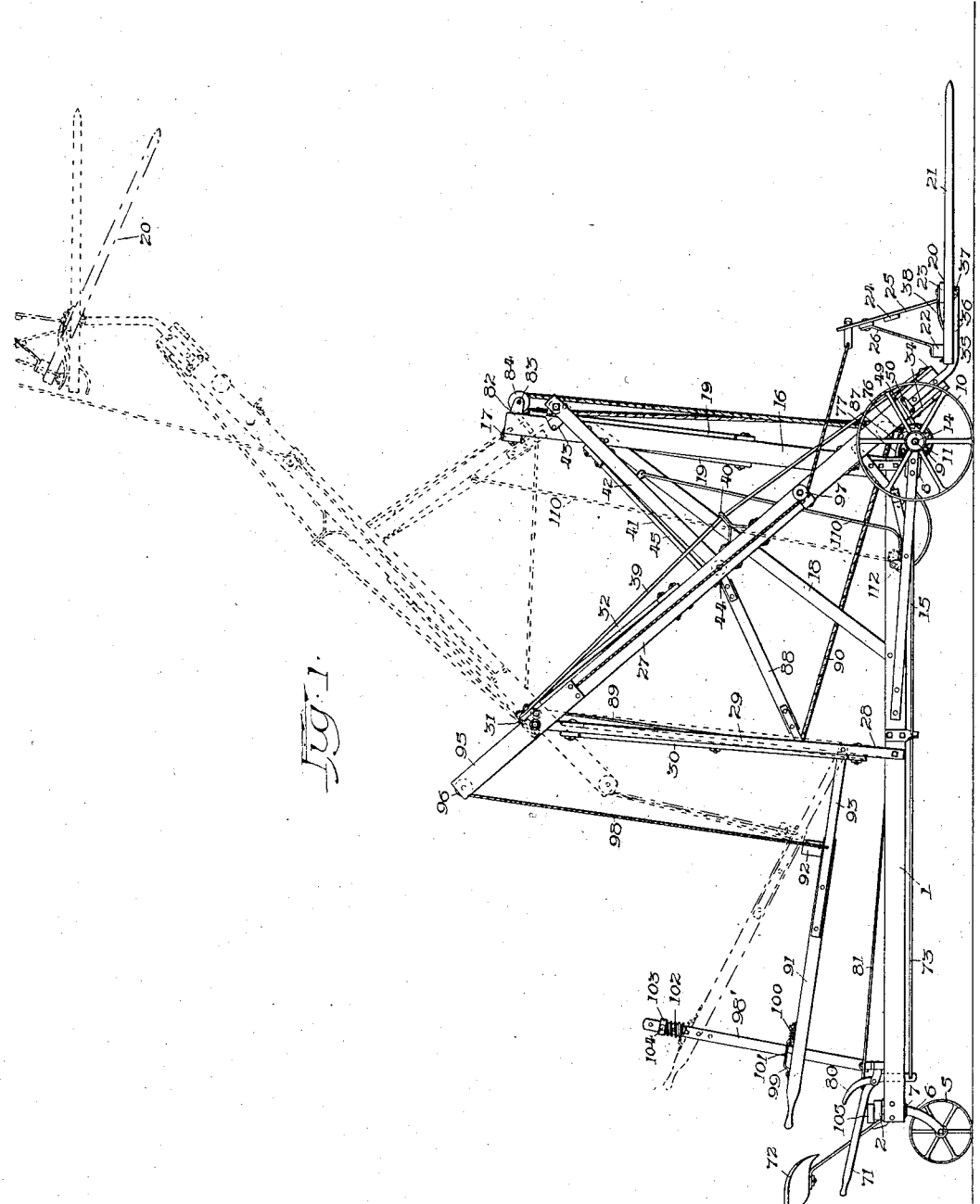

C. PEARSON.
COMBINED HAY RAKE AND STACKER.
APPLICATION FILED DEC. 5, 1910.

993,546.

Patented May 30, 1911.
4 SHEETS—SHEET 1.

Witnesses:
F.W. Hoffmeister.

Inventor
Charles Pearson.
By E.W. Burgess
Attorney

C. PEARSON.
COMBINED HAY RAKE AND STACKER.
APPLICATION FILED DEC. 5, 1910.
993,546.
Patented May 30, 1911.
4 SHEETS—SHEET 2.
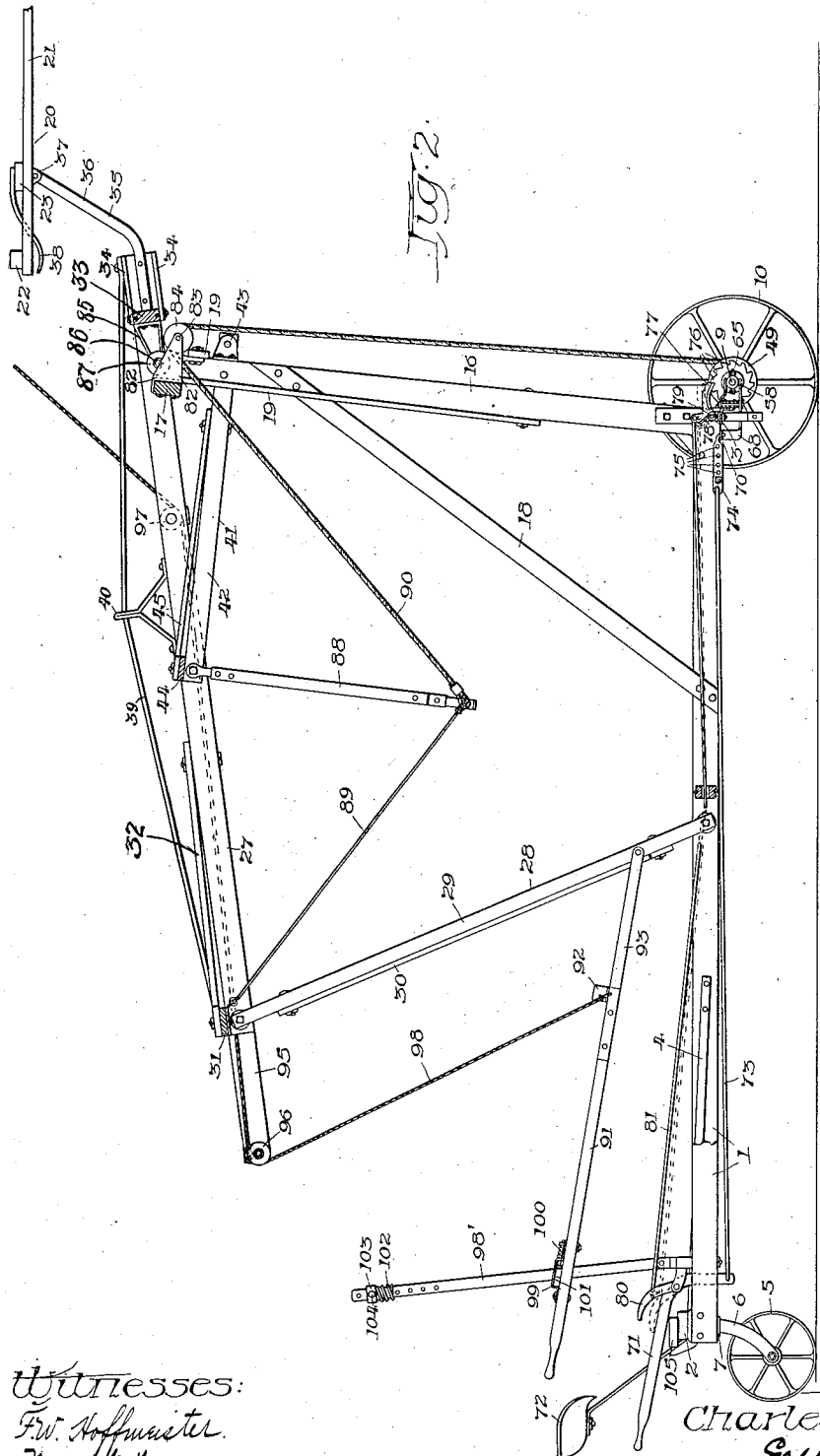
Witnesses:
F.W. Hoffmeister
Inventor:
Charles Pearson
By E.W. Burgess
Attorney.

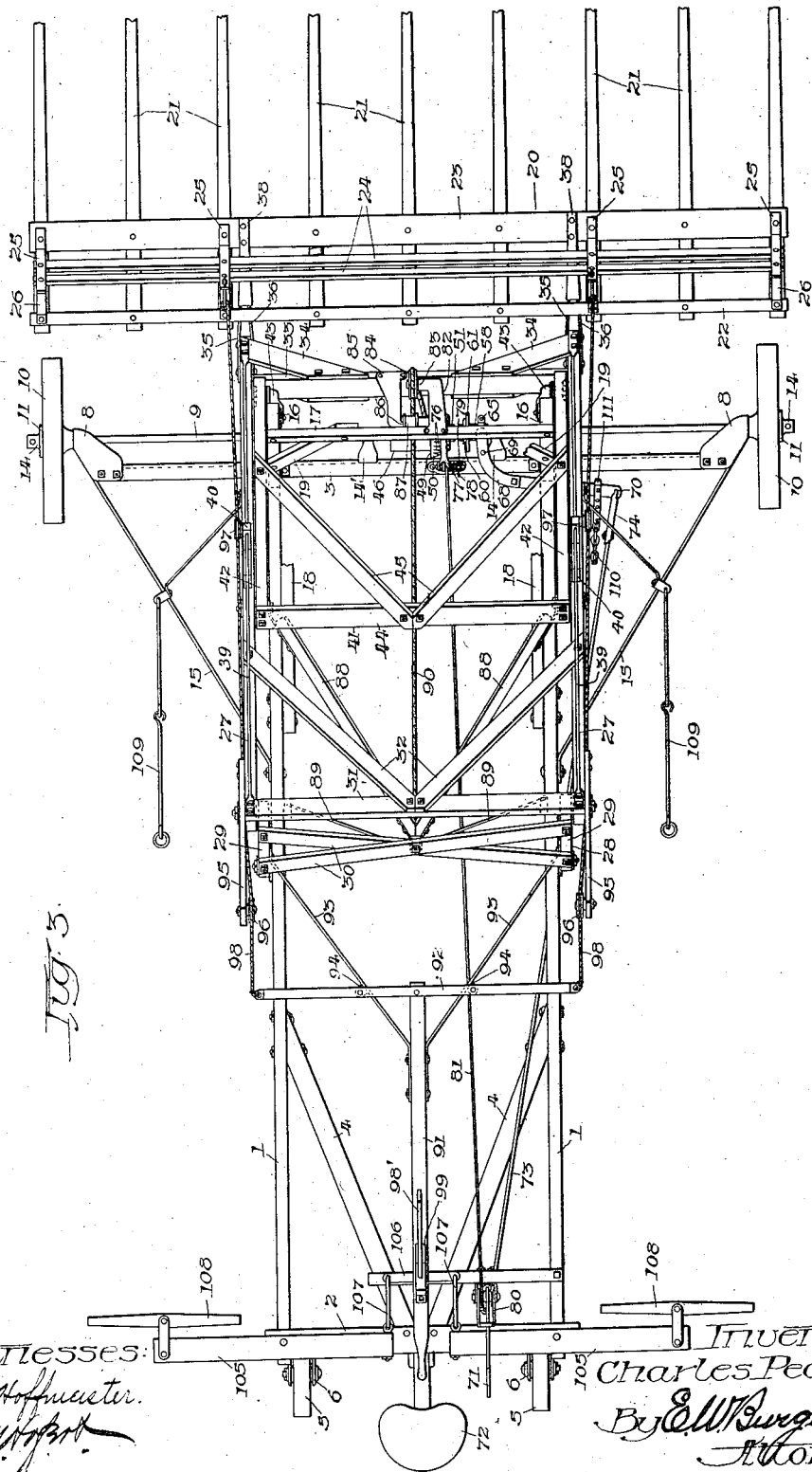

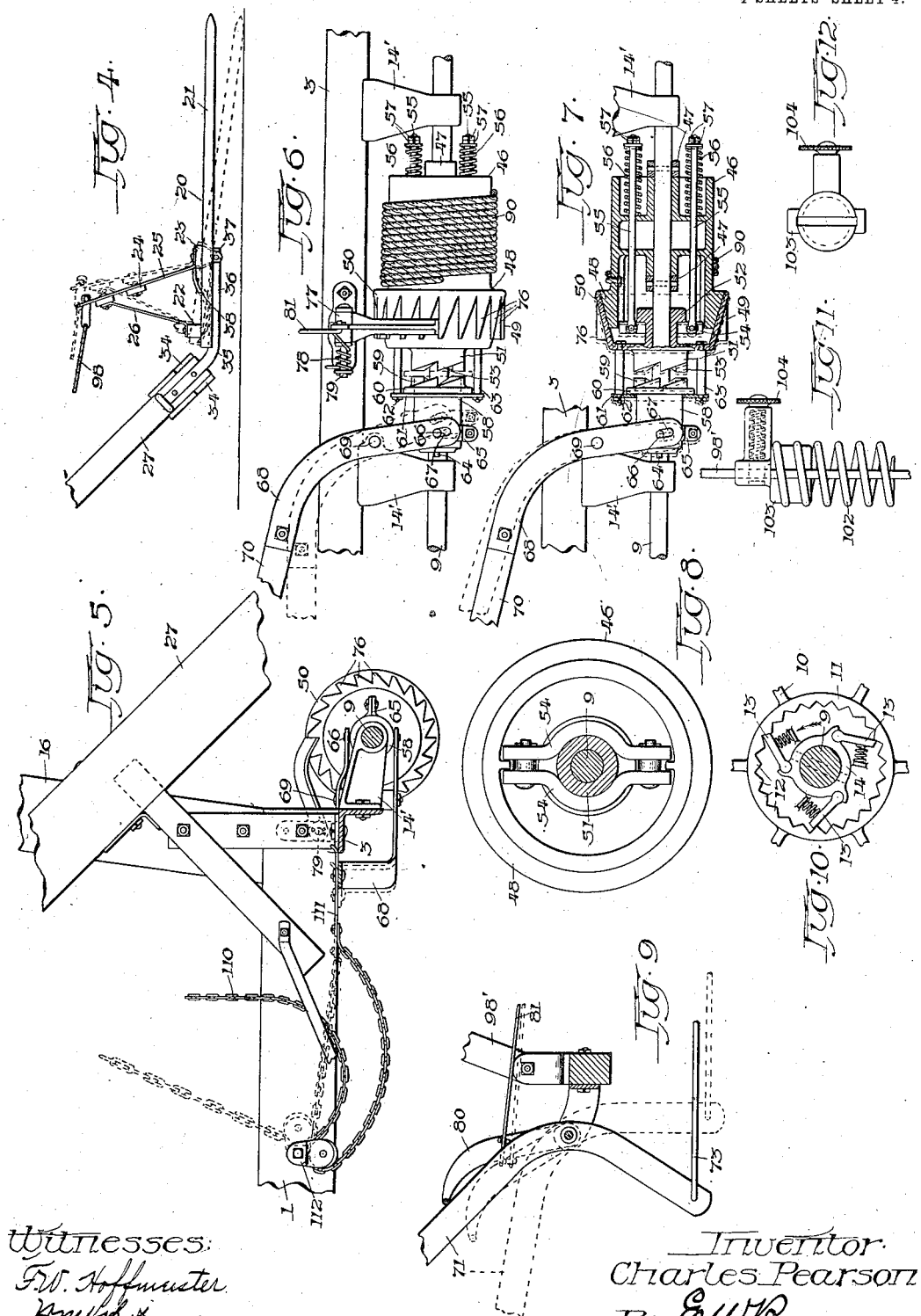

UNITED STATES PATENT OFFICE.

CHARLES PEARSON, OF CHICAGO, ILLINOIS, ASSIGNOR TO INTERNATIONAL HARVESTER COMPANY, A CORPORATION OF NEW JERSEY.

COMBINED HAY RAKE AND STACKER.

993,546.	Specification of Letters Patent.	Patented May 30, 1911.

Application filed December 5, 1910. Serial No. 595,620.

*To all whom it may concern:*

Be it known that I, CHARLES PEARSON, a citizen of the United States, residing at Chicago, in the county of Cook and State of Illinois, have invented certain new and useful Improvements in Combined Hay Rakes and Stackers, of which the following is a specification.

My invention relates to the type of hay rakes commonly called intermittent, wherein are included means for gathering and loading upon the loader fork and then transporting and elevating it to a position from which it may be discharged upon the stack or wagon as may be desired; the object of my invention being to provide an improved mechanism that will be strong and effecient in operation and simple and economical in construction. I attain these objects by means of the mechanism illustrated in the accompanying drawings, in which—

Figure 1 represents a side elevation of a combined rake and stacker having my invention embodied in its construction; Fig. 2 is a view similar to that of Fig. 1, showing the raking and elevating mechanism in a semi-raised position; Fig. 3 represents a plan view of the combined machine; Fig. 4 is a detail of part of the fork controlling means; Fig. 5 is a detail of the automatic clutch releasing means forming part of the fork elevating mechanism; Fig. 6 represents a detached elevation of the clutch mechanism forming part of the fork elevating means; Fig. 7 is a view of the clutch mechanism similar to Fig. 6, partly in section; Fig. 8 is an enlarged end elevation of part of the clutch mechanism, as shown in Figs. 6 and 7; Fig. 9 represents a detached detail of the clutch controlling means; Fig. 10 is a detached detail representing an end elevation of the construction and mounting of the hubs of the traction wheels upon the supporting and driving axles of the machine; Fig. 11 is a detached detail illustrating the manner of constructing the adjustable stop forming part of the fork controlling mechanism; and Fig. 12 is an end elevation of Fig. 11.

The same reference numerals designate like parts throughout the several views.

The wheel frame includes longitudinally arranged base frame members 1 upon opposite sides of the machine, parallel to each other and connected at their rear ends by means of a transverse bar 2, and at their forward ends by means of the transverse bar 3, and 4 represents brace members having their rear ends secured to the central portion of bar 2 and their forward diverging ends to the side frame members 1.

5 represents caster wheels journaled in fork 6, that are free to turn in sockets 7 secured to the rear end of the wheel frame upon opposite sides thereof in a manner whereby the rear end of the frame may be swung laterally in either direction as the direction of advance of the machine may require.

The ends of the transverse bar 3 extend beyond the side members of the wheel frame, and secured thereto are hangers 8, in which is journaled a supporting and driving axle 9, upon which are journaled the carrying and traction wheels 10, the wheels being provided with hubs having annular rims 11, upon which are formed internal ratchet teeth 12 adapted to engage with pawl members 13 mounted upon driving plates 14 secured to the axle and adapted to rotate the latter when the machine is moving in a forward direction, the pawls being released from engagement with the teeth when the machine is moved or the axle rotated in an opposite direction in a well known manner, and 14' represent supplemental hangers secured to the bar between the side members of the frame and having said axles journaled therein.

15 represents brace members having their forward ends secured to the hangers 8 and their rearward converging ends to the side members of the wheel frame.

16 represents vertically arranged frame members upon opposite sides of the machine, having their lower ends secured to the forward ends of the side members of the wheel frame and their upper ends connected by means of a transverse bar 17, and 18 represent downwardly and rearwardly extending brace members having their upper ends secured to members 16 and their lower ends to the side members of the wheel frame.

To prevent a lateral swinging of the upper ends of the vertical brace members, braces 19 are provided, having their upper converging ends secured to the transverse bar 17 and their lower diverging ends to the vertical members.

20 represents the combined rake and fork, including a series of forwardly projecting teeth 21, having a transverse bar 22 secured to their rear ends and a similar bar 23 a short distance forward of bar 22. An upwardly and rearwardly inclined guard 24 is secured to the transverse bar 23 by means of bracket members 25, and 26 represents brace members extending downward and rearward from the guard, having their lower ends secured to bar 22.

The fork carrying frame includes longitudinally arranged side bars 27, upon opposite sides of the machine, that are pivotally connected at their rear ends with the upper end of a swinging derrick frame 28, comprising vertical members 29, having their lower ends pivotally connected with the side members of the wheel frame, and 30 represents brace members secured to the vertical members in a manner to sustain the frame against lateral movement. The rear ends of the fork carrying frame members 27 are connected by means of a transverse bar 31, and 32 represent brace members having their rear ends secured to the central portion of bar 31 and their forward diverging ends to side members 27. The forward ends of members 27 are connected by means of a transverse bar 33 that is secured thereto, and 34 represent brace members having their inner ends secured to opposite sides of the bar and their outer ends to frame members 27.

35 represent curved fork supporting arms having rearwardly and upwardly curved portions secured to opposite sides of frame members 27, and horizontally and forwardly extending portions 36, having their outer ends pivotally connected with brackets 37 secured to the lower side of the transverse bar 23 connected with the rake teeth, and 38 represent plate springs having their forward ends secured to bar 23 and their rear ends adapted to contact with the arms 35 in a manner to cushion the swing of the fork about its pivotal connection therewith when near the limit of its movement in one direction, as shown in Fig. 4.

39 represents truss rods having their opposite ends secured to opposite ends of frame members 27, and 40 represents struts secured to the upper edge of said frame members intermediate their ends and over which the truss rods are drawn.

41 represents a swinging frame including side bars 42, having their forward ends pivotally connected with brackets 43 that are secured to the vertical frame members 16 near their upper ends, the rear ends of bars 42 being pivotally connected with the side members of the fork carrying frame.

44 represents a transverse bar connecting the rear ends of bars 42, and 45 represents brace members having their rear ends secured to the central portion of the bar 44 and their forward diverging ends to bars 42.

Means for elevating the fork carrying frame include a hoisting drum 46, loosely mounted upon the axle 9 between the supplemental hangers 14' and secured against longitudinal movement thereon by means of collars 47 secured to the axle. One end of the hoisting drum is provided with a conical friction clutch portion 48 that is adapted to engage with a complemental clutch member 49, comprising a cup portion 50 that receives the clutch portion 48 of the drum. Integral with the clutch member 49 is a hub portion 51, that is slidably mounted upon the axle and provided at its inner end with a collar 52 and at its outer end with clutch teeth 53, and 54 represents a two-part yoke surrounding the hub and bearing against the collar.

55 represents rods having their inner ends connected with the yoke and passing through the hollow portion of the drum are provided with compression springs 56 at their outer ends, and adjusting nuts 57, whereby the two clutch members are yieldingly held in contact with each other, the degree of pressure being regulated by means of the adjusting nuts.

58 represents a clutch sleeve slidably mounted upon the axle and having clutch teeth 59 upon its inner end that are adapted to engage with the teeth 53 upon the clutch member 49 and a collar 60, and 61 represents a ring surrounding the sleeve and connected with the clutch member 49 by means of bolts 62 and spacing spindles 63, the sleeve being free to move within the ring in one direction to a limited degree to allow the toothed members to engage with each other in an operative manner and the ring to engage with the collar in a manner to disengage the clutch member 49 from a conical clutch piece forming part of the drum when the sleeve is moved in an opposite direction to disengage the toothed clutch members. The clutch sleeve 58 is connected with the axle by means of a spline 64, and 65 represents a common form of split ring seated in an annular groove in the sleeve and provided with trunnions 66 that are received by slotted openings 67 in one end of a clutch shipping fork 68 that is pivotally mounted at 69 upon a fixed part of the wheel frame of the machine, the fork members being connected near their pivot to a lever 70, and 71 represents a hand lever pivotally connected with the rear end of the wheel frame near the operator's seat 72, and connected with the lever 70 by means of a rod 73 and a strap member 74, having a series of holes 75 therein whereby the effective length of the rod may be varied.

The outside periphery of the cup portion 50 of the clutch member 49 is provided with ratchet teeth 76, and 77 represents a pawl pivotally mounted upon the fixed part of the wheel frame and adapted to engage with the ratchet teeth in a manner to prevent the clutch member from rotating in one direction, the pawl being yieldingly pressed into engagement with the teeth by means of a coil spring 78 surrounding its pivot pin 79 and operative between the fixed part of said frame and the pawl in a common way. A foot lever 80 is pivoted coaxially with the hand lever 71 and made in the form of a bail, having its legs upon opposite sides of the hand lever and its head portion adapted to contact with the hand lever when the latter has reached a predetermined limit of forward movement, the foot lever being connected with the pawl by means of a rod 81.

82 represents a bracket secured to the transverse bar 17 and provided with an offset spindle 83, having its axis parallel with the bar and upon which is journaled the sheave 84.

85 represents a bracket secured to the transverse bar 33 of the fork carrying frame and provided with an offset spindle 86, having its axis parallel with spindle 83, and upon which is journaled a roller 87, having flanges at opposite ends thereof, the bracket being arranged in a manner permitting the roller 87 to pass in rear of sheave 84, and in line therewith, in the direction of the longitudinal length of the machine.

88 represents downwardly and inwardly converging bars having their upper ends pivotally connected with the side bars 42 of the swinging frame coaxially with the pivotal connection of the latter with the side members of the fork carrying frame, and their lower ends secured together and connected with the transverse bar 31 at the rear of the fork carrying frame by means of stay rods 89.

90 represents a hoisting cable having one end connected with the lower ends of bars 88 and extending from thence to the roller 87 carried by the fork carrying frame, then upward and over the sheave 84 at the upper end of the vertical frame, and then downward and having its opposite end secured to the hoisting drum. For the purpose of controlling the movement of the fork about its pivotal connection with the fork carrying frame, I provide a mechanism including a hand lever 91, having its rear end within convenient reach of the operator, and having secured to its forward end a transverse bar 92 extending across and above the wheel frame, and also the rear ends of bars 93 extending forward and diverging outward, having their forward ends pivotally connected with the lower end of the swinging frame 28 upon opposite sides thereof, the body portion of the bars being secured to the transverse bar 92 by means of clips 94.

95 represents rearwardly extending arms secured to the rear ends of the side members of the fork carrying frame, and 96 represents sheaves journaled upon studs secured to the rear end of said arms; 97 represents sheaves journaled upon studs secured to the side members of the fork carrying frame intermediate their ends; 98 represents cables having their rear ends connected with opposite ends of the transverse bar 92, and thence over the sheaves 96 at the ends of arms 95, and under the guide sheaves 97, having their outer forward ends secured to fork guard 24.

The rear end of the hand lever 91 is slidably connected with a swinging standard 98' by means of a bracket 99, and 100 represents a spring mounted upon one end of the bracket and operative to press the standard toward the opposite end thereof in a manner to cause a notch 101, formed in the standard, to engage with the bracket and retain the lever in a proper position of adjustment when the fork is in a loading position.

102 represents a buffer spring adjustably mounted at the upper end of the standard, including a block 103 connected with the spring and slidably mounted in the standard and carrying a spring pressed plunger bolt 104 that is adapted to be received by openings in the standard whereby the block may be adjusted along said standard for the purpose of arresting an upward swing of the hand lever to limit the drop or inclination of the fork when in position to dump the load.

The draft animals are connected with the machine by means of draft eveners 105, pivotally connected with the rear end of the wheel frame, at opposite sides thereof, and having their inner ends connected with an equalizing bar 106 by means of links 107.

108 represents swingletrees connected with the outer ends of the draft bars, and 109 represent flexible leading members connected with the forward end of the wheel frame.

Means are provided for automatically arresting the movement of the hoisting mechanism when the fork has been raised to a predetermined level, including a flexible member 110, having one end connected with a strap 111 that is provided with a series of holes whereby it may be adjustably connected with the clutch controlling lever 70. The flexible member 110 passes under a sheave 112, thence upward and connected with the swinging frame 41. When the fork is raised to a predetermined level the member 110 draws rearward on lever 70 in a manner to disengage the toothed clutch members.

In operation the machine is advanced and the load gathered upon the fork in the usual manner, the operator controlling the dip of the teeth by means of the lever 91. When it is desired to raise the load the toothed clutch members are caused to engage and the hoisting drum, being operatively connected therewith by means of the conical friction head, rotates with the axle as the machine advances, the pressure springs being regulated to meet the lifting requirements, and the load may be raised to any height within the capacity of the machine and held in its elevated position by means of the holding pawl engaging with the clutch member 49. In this position the load may be carried to a stack or wagon as desired, and dumped. When lowering the fork the operator manipulates the clutch controlling lever in a manner to loosen the pressure upon the friction clutch members sufficient to allow the weight of the fork to rotate the hoisting drum through its cable connections therewith. The initial movement of the hoisting mechanism acts directly upon the forward end of the fork carrying frame by means of the hoisting cable passing over the sheave 84 and to the roller 87, and swings it upward until the axis of the roller 87 passes above one end of sheave 84, then below, passing directly to the connection of the cable with the lower ends of bars 88, each having their upper ends connected with the rear end of the swinging frame 41, that is connected with the fork carrying frame. The upward movement of the latter is continued until a predetermined height is reached, when the flexible connection between frame 41 and the clutch controlling lever will cause the toothed clutch members to become disengaged and the fork will remain stationary under the frictional engagement of the cone clutch members as controlled by the pressure regulating springs and the pawl engaging with the ratchet teeth upon the clutch member 49. The pivotal connection between the rear end of the fork carrying frame and the upper end of the swinging frame 28, the pivotal connection between the forward end of the swinging frame 41 with the upper ends of frame members 16, and the pivotal connection between the lower end of frame 41 with the side members of the fork carrying frame are so located relatively to each other, being approximately equi-distant apart, that the path of movement of the fork at the forward end of its carrying frame is substantially vertical as it ascends or descends.

Should the operator decide to dump the load, it may be effected by releasing the lever 91 from its engagement with the standard 98. To allow the fork to descend the operator raises lever 71, thereby moving the clutch sleeve member 58 outward along the axle and against ring 61, that, through its connection with the sliding member 49 of the cone clutch mechanism, will move the latter against the force of the pressure spring connected therewith in a manner to allow the winding drum to rotate independently of the complemental clutch member 49; or the draft animals may move the machine rearward. With the pawl released from engagement with the clutch member 49 the same result will be accomplished by reason of the winding drum and its associated clutch member rotating together.

What I claim as my invention, and desire to secure by Letters Patent, is:

1. A combined hay rake and stacker including, in combination, a wheel frame, a fork, a fork carrying frame having said fork connected with its forward end, a vertically arranged fixed frame secured to the forward end of said wheel frame, a swinging derrick frame pivotally connected at its lower end with said wheel frame in rear of said fixed frame, the rear end of said fork carrying frame having a pivotal connection with the upper end of said derrick frame, a frame having its forward end pivotally connected with the upper end of said fixed frame and its opposite end with said fork carrying frame whereby the path of movement of said fork carrying frame is controlled, and means for raising and lowering said fork carrying frame.

2. A combined hay rake and stacker including, in combination, a wheel frame, a fork, a fork carrying frame having said fork connected with its forward end, a vertically arranged fixed frame secured to the forward end of said wheel frame, a swinging derrick frame having its lower end pivotally connected with said wheel frame in rear of said fixed frame, the rear end of said fork carrying frame having pivotal connection with the upper end of said derrick frame, means for raising and lowering the forward end of said fork carrying frame, and means connecting said fork carrying frame with a fixed part of said wheel frame and operative to control the path of movement of said fork carrying frame.

3. A combined hay rake and stacker including, in combination, a wheel frame, a fork, a fork carrying frame having said fork connected with its forward end, a vertically arranged fixed frame secured to the forward end of said wheel frame, a swinging derrick frame having its lower end pivotally connected with said wheel frame in rear of said fixed frame, the rear end of said fork carrying frame having pivotal connection with the upper end of said derrick frame, means for raising and lowering the forward end of said fork carrying frame, said means including a swinging frame having its forward end pivotally connected with the upper end of said fixed frame and its opposite end with said fork carrying frame, the axes of the series of pivotal connections being approximately equi-distant apart, whereby the path of movement of said fork carrying frame is maintained in a substantially vertical line.

4. A combined hay rake and stacker including, in combination, a wheel frame, a fork, a fork carrying frame having said fork pivotally connected with its forward end in a manner to swing about its pivotal connection when dumping a load, means for raising and lowering the forward end of the fork carrying frame, and buffer springs operative between said fork and its carrying frame in a manner to cushion its return to an operative position.

5. A combined hay rake and stacker including, in combination, a wheel frame, a fork, a fork carrying frame including longitudinally arranged side members having their rear ends flexibly connected with said wheel frame, curved arms secured to the forward ends of said side members, said fork being pivotally connected with the forward ends of said arms in a manner to swing downward at its forward end in its operation of dumping the load, plate springs secured to said fork and adapted to contact with said arms in a manner to cushion the return of said fork to an operative position.

6. A combined hay rake and stacker including, in combination, a wheel frame having longitudinally arranged side frame members, a transverse bar secured to the forward ends of said side frame members and having its opposite end extending beyond said wheel frame, hangers secured to the opposite ends of said bar, an axle journaled in said hangers and supported against deflection at its central portion, a hoisting drum mounted upon said axle, a fork, a fork carrying frame, said fork being pivotally connected with the front end of said fork carrying frame in a manner to swing about its pivotal connection in dumping a load, buffer springs operative between said fork and its carrying frame in a manner to cushion its return to an operative position, said fork carrying frame being flexibly connected at its rear end with said wheel frame in a manner to rise and fall at its forward end, and a cable operatively connecting said hoisting drum with said fork carrying frame.

7. A combined hay rake and stacker including, in combination, a wheel frame having longitudinally arranged side frame members, an axle mounted at the forward end of said wheel frame, a hoisting drum connected with said axle, a vertically arranged frame secured to the forward end of said wheel frame, a fork, a fork carrying frame, said fork carrying frame being flexibly connected at its rear end with said wheel frame in rear of said vertical frame, said fork carrying frame having depending bars secured thereto forward of its connection with said wheel frame, a sheave journaled at the upper end of said vertical frame, a roller journaled upon the outer end of said fork carrying frame, and a cable having one end secured to said hoisting drum and passing over said sheave journaled on the vertical frame and under said roller, having its opposite end secured to the lower ends of said depending bars.

8. A combined hay rake and stacker including, in combination, a wheel frame having longitudinally arranged side frame members, an axle mounted at the forward end of said wheel frame, a hoisting drum connected with said axle, a vertically arranged frame secured to the forward end of said wheel frame, a fork, a fork carrying frame, said fork carrying frame being flexibly connected at its rear end with said wheel frame in rear of said vertical frame, said fork carrying frame having depending bars secured thereto forward of its connection with said wheel frame, a sheave journaled at the upper end of said vertical frame, a roller journaled upon the forward end of said fork carrying frame, a cable having one end secured to said hoisting drum and passing over said sheave at the upper end of said vertical frame and under said roller, and having its opposite end secured to the lower ends of said depending bars, said roller adapted to pass above said sheave when the fork carrying frame is raised to its highest limit of movement.

9. A combined hay rake and stacker including, in combination, a wheel frame having longitudinally arranged side frame members, an axle mounted at the forward end of said wheel frame, a hoisting drum connected with said axle, a vertically arranged frame secured to the forward end of said wheel frame, including a transverse bar at its upper end, a bracket secured to said transverse bar and having a lateral offset portion and a sheave journaled upon said offset portion, the axis of said sheave being parallel with said transverse bar, a fork, a fork carrying frame including side frame members and a transverse bar secured to the forward end of said side frame members, the rear end of said fork carrying frame being flexibly connected with said wheel frame in rear of said vertical frame, said fork carrying frame having depending bars secured thereto forward of its connection with said wheel frame and upon opposite sides thereof, a bracket secured to the transverse bar connecting the forward ends of the said side frame members of the fork carrying frame, the said bracket having a lateral offset portion extending parallel with and in an opposite direction to the offset portion on said first mentioned bracket and having a roller journaled thereon, said roller passing in rear of and above the axis of said sheave when the fork carrying frame is raised above the vertical frame, and a cable having one end secured to said hoisting drum and passing over the sheave and under said roller, and having its opposite end secured to the lower ends of said depending bars.

CHARLES PEARSON.

Witnesses:
RAY PATTISON,
FRANK BELKA.